(12) United States Patent
Hors et al.

(10) Patent No.: US 8,314,518 B2
(45) Date of Patent: Nov. 20, 2012

(54) METHOD FOR MONITORING THE OUTPUT OF AN ELECTROMECHANICAL ACTUATOR OF THE ROTARY-LINEAR TYPE

(75) Inventors: Daniel Hors, Paris (FR); Francis Lepore, Paris (FR); Jean-François Weibel, Paris (FR)

(73) Assignee: Sagem Defense Securite, Paris (FR)

( * ) Notice: Subject to any disclaimer, the term of this patent is extended or adjusted under 35 U.S.C. 154(b) by 390 days.

(21) Appl. No.: 12/744,708

(22) PCT Filed: Nov. 27, 2008

(86) PCT No.: PCT/FR2008/052143
§ 371 (c)(1),
(2), (4) Date: May 26, 2010

(87) PCT Pub. No.: WO2009/071848
PCT Pub. Date: Jun. 11, 2009

(65) Prior Publication Data
US 2010/0301838 A1    Dec. 2, 2010

(30) Foreign Application Priority Data
Nov. 30, 2007   (FR) ...................................... 07 08401

(51) Int. Cl.
*H02K 41/02* (2006.01)
(52) U.S. Cl. ................................. 310/12.14; 310/12.27
(58) Field of Classification Search ..... 310/12.01–12.33
See application file for complete search history.

(56) References Cited

U.S. PATENT DOCUMENTS

| | | | | |
|---|---|---|---|---|
| 5,076,537 A * | 12/1991 | Mears, Jr. | ....................... | 251/65 |
| 6,791,215 B2 * | 9/2004 | Tesar | ......................... | 310/12.24 |
| 7,250,697 B2 * | 7/2007 | Beaulieu | ..................... | 310/12.12 |
| 8,061,490 B2 * | 11/2011 | Di Stefano et al. | ........... | 188/162 |
| 2004/0007923 A1 * | 1/2004 | Tesar | ............................... | 310/12 |
| 2004/0061382 A1 * | 4/2004 | Schreier | .......................... | 310/13 |
| 2005/0103928 A1 | 5/2005 | Flatt | | |
| 2006/0125325 A1 * | 6/2006 | Beaulieu | ......................... | 310/12 |
| 2008/0297074 A1 * | 12/2008 | Sheahen et al. | ............... | 318/115 |
| 2010/0102645 A1 * | 4/2010 | Trietz et al. | ................. | 310/12.31 |
| 2011/0234021 A1 * | 9/2011 | Eckstein et al. | ........... | 310/12.31 |

FOREIGN PATENT DOCUMENTS

| EP | 1 793 477 | 9/2007 |
|---|---|---|
| WO | WO 2005/024273 | 3/2005 |
| WO | WO 2007/099333 | 9/2007 |

OTHER PUBLICATIONS

International Search Report from counterpart application No. PCT/FR2008/052143; Report dated Apr. 27, 2009.
French Preliminary Search Report from priority application FR 0708401; Report dated Jul. 18, 2008.

* cited by examiner

*Primary Examiner* — Thanh Lam
(74) *Attorney, Agent, or Firm* — Miller, Matthias & Hull LLP

(57) ABSTRACT

The invention relates to a method for monitoring the output of an electromechanical actuator of the rotary-linear type in order to detect a gradual seizing thereof, wherein said method comprises: measuring the intensity, representative of the motor torque, of the electrical current powering an induction winding of the actuator and the axial stress undergone by an actuator rod; calculating the ratio (axial stress undergone by an actuator rod/motor torque) representative of the global output of the actuator and of its present state; and generating an evaluation of the present condition of the actuator based on its present state and optionally on previous stored states and on outer parameters.

9 Claims, 1 Drawing Sheet

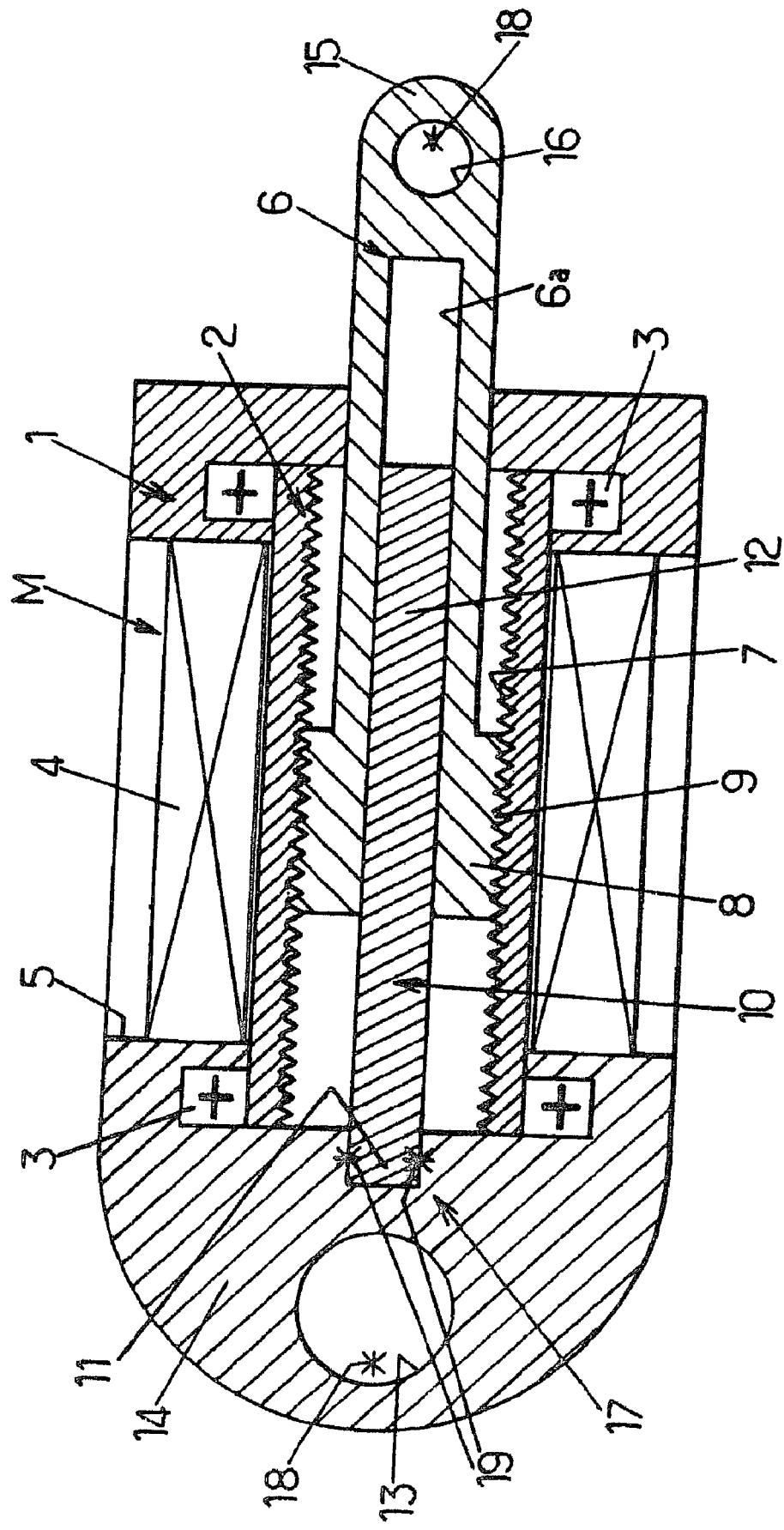

METHOD FOR MONITORING THE OUTPUT OF AN ELECTROMECHANICAL ACTUATOR OF THE ROTARY-LINEAR TYPE

CROSS-REFERENCE TO RELATED APPLICATIONS

This application is a 35 USC §371 U.S. national stage filing of International Patent Application No. PCT/FR2008/052143 filed on Nov. 27, 2008, which claims priority under the Paris Convention to French Patent Application No. 07 08401, filed on Nov. 30, 2007.

FIELD OF THE DISCLOSURE

The present invention relates generally to the field of electromechanical actuators of the rotary-linear type, and it relates more precisely to the field of the monitoring of electromechanical actuators of the rotary-linear type in order to detect gradual seizing of said actuator, in order to provide elements of information making it possible to determine their continued operation or their replacement.

BACKGROUND OF THE DISCLOSURE

The single FIGURE in the attached drawing provides a very schematic representation of the general configuration of an example of an electromechanical actuator of the rotary-linear type with which the invention is concerned. As a succinct reminder, such an actuator comprises:

a casing 1;
rotary electric motor means M comprising at least one field winding; and
at least one nut 2 rotatably supported in bearings 3 of said casing 1 and integral in rotation with said motor means M.

In the example more specifically shown, which corresponds to a rotary-linear actuator of the direct drive type:

the rotary electric motor means M, that are of an electromagnetic type, comprise electric windings or field windings 4 that are arranged in a ring and are supported in particular in at least one slot 5 provided in the casing 1 or in a frame integral with the latter, the assembly constituting a stator, and that are capable of generating a rotating field driving in rotation a rotor arranged coaxially inside the ring of windings 4; and
the at least one nut 2 is arranged coaxially inside the ring of windings 4 constituting the abovementioned rotor, this nut 2 being able to be equipped with magnets, typically with permanent magnets, so as to be driven in rotation in the bearings 3 by the rotating field.

Moreover, the actuator comprises:
at least one actuator rod 6 arranged substantially coaxially with the nut 2, said nut 2 and said actuator rod 6 being coupled in rotation by axial helical meshing means; to this end, as shown in the FIGURE, the nut 2 is presented in the general form of a tubular element the inner surface of which is, over at least part of its length, provided with at least one helical thread 7, whilst the actuator rod 6 has one end inside the nut 2, which can be a widened portion 8 as illustrated, which is provided with a helical thread 9 on the outside;
means 17 for locking the actuator rod 6 in rotation relative to the casing 1 so that the rotation of the nut 2 leads to a linear displacement of the actuator rod 6; said means for locking in rotation can simply be constituted by a key 10 arranged substantially coaxially with the nut 2 and extending axially, said key 10 having a non-circular section (for example polygonal, in particular square) and having one end 11 embedded in the casing in fixed manner and its other end 12 engaged sliding freely in an axial bore 13 in the actuator rod 6;
means provided on the casing 1 for fastening said casing 1 to a fixed or displaceable component; for example one (or more) part(s) of the casing 1, such as in particular the end 14 of the casing 1 opposite the protruding part of the actuator rod 6 and which can for example be in the form of a clevis, is equipped with an eyelet 13 capable of receiving a coupling element;
means provided on the actuator rod 6 for fastening the free end 15 of said actuator rod 6 to a component which is respectively displaceable or fixed; a simple solution is for said end 15 of the actuator rod 6 to be equipped with an eyelet 16 capable of receiving a coupling element.

Of course, the above description is given only as an indication to give an idea, it being understood that numerous embodiments of rotary-linear-type actuators exist or can be envisaged; in particular, a double actuator can be derived from the structure previously described by providing, in the ring of windings 4, two nuts 2 arranged end to end and having respective reverse pitch threads or a single nut with two successive reverse pitch threads, with which two opposite actuator rods engage. Moreover, the term thread must be understood in a broad sense, as being able to denote a standard trapezoidal screw as well as a ball screw or a roller screw.

Electromechanical actuators of the rotary-linear type are nowadays used in particular (although not exclusively) in equipment on so-called "all-electric" modern aircraft. The design of an "all-electric" aircraft involves eliminating the hydraulic systems and controls used up till then and replacing them with electromechanical solutions involving electromechanical actuators and in particular electromechanical actuators of the rotary-linear type. The electromechanical actuators of the rotary-linear type used in this context can serve, for example, to drive the aircraft's stabilators (wing flaps, flight control surfaces etc.).

Of course, the electromechanical solutions thus put into place must offer a degree of dependability at least equal to that of the previous hydraulic solutions. The dependability analysis highlights the following failures:

breakage of the mechanical linkage,
fouling of the surface,
seizing of the surface.

The first two failures mentioned are not characteristic solely of electromechanical actuators of the rotary-linear type and can occur with other solutions (for example the previous hydraulic solutions). Solutions are therefore known for dealing with these problems, solutions which can be repeated in the case of electromechanical actuators of the rotary-linear type.

By contrast, the third failure mentioned (seizing of the surface) is characteristic of electromechanical actuators of the rotary-linear type, and it is essential to prevent seizing of such an actuator, or at the very least be informed of its occurrence.

The invention is based on the fact that seizing does not appear suddenly and that it leads to a gradual degradation of blocking performance, and therefore a deterioration of performance, of the actuator. The invention is therefore based on detection of the advance warning signs of seizing.

Conversely, this implies that, if sudden seizing of the actuator is possible, the means proposed in the context of the present invention are ineffective in providing any advance warning of the occurrence of the sudden seizing.

SUMMARY OF THE DISCLOSURE

It is in this context that an object of the invention is to propose appropriate means for preventing gradual seizing exclusively of an electromechanical actuator of the rotary-linear type, it being understood moreover that the invention aims only to propose means capable of providing information on the state of the electromechanical actuator of the rotary-linear type, without going as far as the subsequent steps of determining the advisability of retaining or replacing said actuator, which are left to the users' initiative.

For these purposes, the invention proposes a method for monitoring the output of an electromechanical actuator of the rotary-linear type in order to detect gradual seizing of said actuator, said actuator comprising:
- a casing,
- rotary motor means,
- at least one nut rotatably supported in bearings of said casing and integral in rotation with said motor means,
- at least one actuator rod arranged coaxially with the nut, said nut and said actuator rod being coupled in rotation by axial helical meshing means,
- means for locking the actuator rod in rotation relative to the casing so that the rotation of the nut leads to a linear displacement of the actuator rod,
- means provided on the casing for fastening the casing to a fixed or displaceable component, and
- means provided on the actuator rod for fastening the free end of the actuator rod to a component that is respectively displaceable or fixed, this method being characterized by the following steps:
a) the intensity of the electric current powering the field winding is measured, said intensity being representative of the motor torque, and
   a stress representative of the axial stress to which the actuator rod is subjected, is measured,
b) from these measurements, the [axial stress to which the actuator rod is subjected/motor torque] ratio which is representative of the overall output of the actuator and representative of the present state of the actuator, is calculated,
c) then an evaluation of the actuator's present state of health is produced, which is based on the actuator's present state and optionally on the previous stored states of the actuator and/or on external parameters.

The means proposed by the invention offer the advantage of allowing precise monitoring of the state of health of the actuator, and therefore of monitoring the development of a gradual seizing as of the first indications of the occurrence thereof.

The means proposed by the invention also offer the additional advantage of very great flexibility of use: in particular, the various steps leading to the health diagnosis of the actuator can be carried out automatically or triggered on demand during checks; they can also be carried out automatically on a permanent basis (the actuator individually being under constant monitoring) or cyclically (for example all the actuators of a device such as an aircraft or all the actuators in a group of actuators are tested successively in a cyclical manner).

Yet another advantage of the solution proposed by the invention resides in the fact that the use of the information thus obtained is entirely up to the user of the actuator, so that various users remain free to react differently to the same state of health detected on the actuator.

It is possible to improve knowledge of the state of the actuator by obtaining redundant information by means of additional measurements and calculations.

BRIEF DESCRIPTION OF THE DRAWINGS

The invention will be better understood on reading the following detailed description of certain preferred methods of use of the method of the invention, which are given only as examples which are in no way limiting.

DETAILED DESCRIPTION OF THE DISCLOSURE

According to the method according to the invention, a step a) consists of:
- measuring the intensity of the electric current powering the field winding(s) or winding(s) 2, said intensity being representative of the motor torque; this information is already used elsewhere, in particular in the control law of the actuator, and is therefore available without it being necessary to install particular sensing equipment or carry out a specific measurement; and
- measuring a stress representative of the axial stress to which the actuator rod is subjected 6; this measurement can be carried out either at the coupling of the casing 1 (in particular at its coupling eyelet 13) to a fixed or displaceable component, or at the coupling of the free end 15 (in particular of its coupling eyelet 16) of the actuator rod 6 to a component that is respectively displaceable or fixed; to this end, it is possible for example to utilize strain gauges (schematically represented as 18) interposed axially between the casing 1 and the fixed or displaceable component to which it is fixed (for example between the edge of its eyelet 13 and the coupling element that is engaged in the latter) in order to measure the axial stress to which said casing 1 is subjected and which is representative of the axial stress to which the actuator rod 6 is subjected, or in the same way between the actuator rod 6 and the respective displaceable or fixed component to which it is fixed (for example between the edge of its eyelet 16 and the coupling element that is engaged in the latter) in order to measure directly the axial stress to which the actuator rod 6 is subjected; it is also possible, in preferred manner, to resort to, instead of the clevis conventionally provided on the casing, a calibrated hollow coupling shaft (not shown) (or calibrated clevis) commonly available commercially (for example those marketed by FGP Sensors), which deliver an electric signal representative of the axial stress to which this hollow shaft is subjected, and therefore representative of the axial stress to which the actuator rod 6 is subjected; the installation of such a sensor is a safety requirement in order to avoid an overload of the stress borne by the rod, with implementation of a limitation stress threshold set to a value less than the maximum stress that can be borne by the actuator rod and predetermined in relation to the chosen degree of safety (for example of the order of 20 to 30 in the field of aviation): therefore, the information on the axial stress to which the actuator rod 6 is subjected is already available and does not require the addition of equipment.

The appearance of seizing leads to an increase in the intensity of the current powering the field windings and/or a reduction, for a given intensity, in the stress on the actuator rod.

In order to take advantage of this characteristic, in step b), the following ratio is calculated from the abovementioned measurements:

$$\eta_1 = [\text{axial stress to which the actuator rod 6 is subjected/motor torque}]$$

which is as a result representative of the overall output of the actuator and is representative of its present state by reference to predetermined pairs of intensity/motor torque values for sound actuators.

Finally, an evaluation of the present state of health of the actuator is produced, which is based on the present state of the actuator determined as indicated above as well as, optionally, on other additional information such as the stored previous states of the actuator, which can optionally serve as the reference mentioned above (whether these are individual measurements, or an average of previous measurements) and/or on external parameters (for example temperature, speed of the aircraft in the context of such an application etc.).

The steps that have just been discussed can advantageously be supplemented by additional steps capable of providing additional information which, although admittedly redundant, for that very reason improves the safety aspect of the diagnosis given of the state of health of the actuator.

Thus, it can be advantageous to provide that:
in the abovementioned step a), a torque is also measured, representative of the antirotation torque between the means 17 for locking in rotation and the actuator rod 6; it is possible to this end to interpose strain gauges (schematically represented as 19) transversally between the end 11 of the actuator rod 6 embedded in the casing 1 and the embedding recess provided to this end in the casing 1 (the gauges being able for example to be easily stuck to the outside lateral surfaces of said end 11 of the actuator rod 6; and
in the abovementioned step b), the following ratio is also calculated:

$$\eta_2 = [\text{antirotation torque/motor torque}]$$

which is representative of the state of the bearings 3 for rotatably mounting the rotating nut 2 on the casing 1.

Also, it can be advantageous to provide, either in isolation, or in combination with the determination of the ratio $\eta_2$, that:
in the abovementioned step a), a torque representative of the antirotation torque between the means 17 of locking in rotation and the actuator rod 6 is also measured, for example under the conditions set out above; and
in the abovementioned step b), the following ratio is also calculated:

$$\eta_3 = [\text{antirotation torque/axial stress to which the actuator rod 6 is subjected}]$$

which is representative of the state of the respective cooperating axial helical meshing means 7, 9 of said nut 2 and said actuator rod 6.

Knowing the abovementioned additional ratios $\eta_2$ and/or $\eta_3$ makes it possible to reinforce the safety aspects, and also makes it possible to provide fault or breakdown locating elements, which can prove to be important for facilitating and/or speeding up maintenance.

The various measurements that are carried out within the context of the method of the invention lead to the generation of respective electric signals which, after shaping and in particular digitizing, can be processed in any appropriate manner either in situ, or remotely, in order to provide the required information on the state of health of the actuator.

The implementation of the method of the invention that has just been set forth can give rise to numerous variants, reflected in numerous variants in the arrangement of the actuator.

Thus, the electromechanical actuator of the rotary-linear type that has been more specifically taken into consideration in the above is of the direct drive type comprising at least one electric field winding 4 that is housed fixed in the casing 1 and which is capable of generating a rotating field; the nut 2 (or the nuts) is arranged coaxially with the field winding 4 and inside the latter and is equipped with magnets, typically permanent magnets, which are driven in rotation by the rotating field and by means of which the nut 2 is itself driven in rotation. This is the type of actuator that seems to have to be more widely covered by the method of the invention. However, the method of the invention may find an equally beneficial application in the case of electromechanical actuators of the rotary-linear type with indirect drive with interposition of a transmission, in particular a reduction gear.

It is also advantageous to provide that the bearings 3 for rotatably mounting the nut 2 on the casing 1 are antifriction bearings, either ball or roller bearings.

The axial helical meshing means 7, 9 coupling the nut 1 and the actuator rod 6 can be constituted by normal threads 7 and 9 respectively machined on the facing surfaces of the nut 1 and the actuator rod 6, respectively. However, it may prove particularly useful, for reducing friction, for the axial helical meshing means 7, 9 coupling the nut 1 and the actuator rod 6 to be formed by an antifriction screw.

The invention claimed is:
1. A method for monitoring the output of an electromechanical actuator of the rotolinear type for the purposes of detection of a gradual seizing of said actuator, said actuator comprising:
a casing,
electric motor means for driving in rotation including at least one induction winding,
at least one nut supported for rotation in bearings of said casing and driven in rotation by said motor means,
at least one actuator rod arranged coaxially with said nut, said nut and said actuator rod being coupled in rotation by axial helical meshing means,
means for blocking said actuator rod in rotation with respect to said casing so that the rotation of said nut leads to a linear displacement of said actuator rod,
a means provided on said casing for fastening said casing to a fixed or displaceable component, and
a means provided on said actuator rod for fastening a free end of said actuator rod to a component which is respectively displaceable or fixed, the method comprising the following steps:
a) the intensity of an electric current powering said induction winding is measured, said intensity being representative of a motor torque, and
a stress representative of an axial stress to which said actuator rod is subjected, is measured,
b) from these measurements, the axial stress to which said actuator rod is subjected/motor torque ratio, which is representative of an overall output of said actuator and representative of the present state of said actuator is calculated,
c) an evaluation of the actuator's present state of health of the actuator is produced which is based on the present state of said actuator and optionally on previous stored states of said actuator and on outer parameters,
wherein in Step a) a torque representative of an antirotation torque between said means for blocking in rotation and said actuator rod is also measured, and in Step b) the [antirotation torque/motor torque] ratio which is representative of the state of said bearings for mounting said nut for rotation on said casing and/or the [antirotation torque/axial stress to which said actuator rod is subjected] ratio which is representative of the state of said respective cooperating axial helical meshing means of said nut and said actuator rod is/are also calculated.

2. The method according to claim 1, wherein said electromechanical actuator of the rotolinear type is of the direct-drive type comprising at least one electric induction winding which is housed fixed in said casing and which is suitable for generating a rotary field and said at least one nut is arranged coaxially with said induction winding and is equipped with magnets.

3. The method according to claim 1, wherein in order to measure said antirotation torque, at least one strain gauge is interposed transversally between said means for blocking in rotation and said actuator rod.

4. The method according to claim 1, wherein said fastening means provided on said casing and said actuator rod is of the type of a clevis and at least one strain gauge is interposed axially between said clevis and said respective fixed or displaceable component to which it is fastened in order to measure said axial stress to which said clevis is subjected and which is representative of said axial stress to which said actuator rod is subjected.

5. The method according to claim 1, wherein, in order to measure said the stress representative of said axial stress to which said actuator rod is subjected, said fastening means provided on said casing or said actuator rod is a hollow shaft.

6. The method according to claim 1, wherein said bearings for mounting said nut for rotation on said casing are antifriction bearings.

7. The method according to claim 1, wherein said axial helical meshing means coupling said nut and said actuator rod comprise an antifriction screw.

8. The method according to claim 2, wherein said nut is single and is arranged coaxially inside said induction winding and said actuator rod is single and is arranged inside and coaxially with said nut.

9. The method according to claim 2 wherein said means for blocking said actuator rod in rotation with respect to said casing comprise a key anchored in fixed manner in said casing and engaged sliding freely in an axial slot in said actuator rod.

\* \* \* \* \*